United States Patent [19]

Narita et al.

[11] 4,153,780

[45] May 8, 1979

[54] PROCESS FOR THE PREPARATION OF POLYCARBONATE WITH WEATHERPROOF PROPERTY

[75] Inventors: Yoshihiro Narita; Hideo Konuma; Sanae Tagami; Hirosi Yamada, all of Tokuyama, Japan

[73] Assignee: Idemitsu Kosan Company Limited, Japan

[21] Appl. No.: 436,333

[22] Filed: Jan. 14, 1974

[30] Foreign Application Priority Data

Jan. 25, 1973 [JP] Japan .................................. 48-9855

[51] Int. Cl.$^2$ ...................... C08G 63/62; C08L 69/00
[52] U.S. Cl. .................................... 528/198; 528/128; 528/199
[58] Field of Search .................................. 260/47 XA

[56]  References Cited

U.S. PATENT DOCUMENTS

| 3,322,719 | 5/1967  | Peilstocker   | 260/47 XA |
| 3,391,110 | 7/1968  | Coleman       | 528/578   |
| 3,518,175 | 6/1970  | Bell          | 260/47 XA |
| 3,660,083 | 5/1972  | Bloom et al.  | 260/47 XA |
| 3,697,481 | 10/1972 | Bialous et al.| 260/47 XA |
| 3,787,359 | 1/1974  | Horn et al.   | 260/47 XA |

FOREIGN PATENT DOCUMENTS 965457  7/1964  United Kingdom ............... 260/47 XA Primary Examiner—Wilbert J. Briggs, Sr.
Attorney, Agent, or Firm—McGlew and Tuttle

[57] ABSTRACT

A process is provided for preparing a polycarbonate composition with excellent weatherproof properties. The process comprises adding an ultraviolet absorbing compound having a hydroxy group which contributes at least partially to the molecular weight modifier to an oligomeric polycarbonate which is obtained by the reaction of a dioxy compound with phosgene, and then condensing said oligomeric polycarbonate to polymerize the same. The invention also concerns a process for preparing a polycarbonate with excellent weatherproof properties which process comprises introducing a dioxy compound in alkaline solution and an organic solvent for the polycarbonate into a tubular reactor continuously to form a turbulent flow, feeding phosgene concurrently to the reactor with cooling outside of the reactor to produce an oligomeric polycarbonate as the solution of organic solvent, adding an aqueous alkaline solution of dioxy compound, molecular weight modifier, which is contained at least in part ultraviolet absorbing compound having an hydroxy group, and catalyst selected from the group consisting of tertiary amine and quaternary ammonium salt and, if desired, antioxidant to said oligomeric polycarbonate solution and condensing said oligomeric polycarbonate to polymerize the same.

7 Claims, No Drawings

PROCESS FOR THE PREPARATION OF POLYCARBONATE WITH WEATHERPROOF PROPERTY

BACKGROUND OF THE INVENTION

1. Field of the Invention

This invention relates to a method of producing a polycarbonate composition having excellent weatherproof properties by the phosgene process.

2. The Prior Art

It has been known heretofore to produce high molecular polycarbonate compositions by the method which comprises reacting a dioxy compound such as bisphenol A with phosgene to prepare carbonate oligomer and then condensing the so-obtained oligomer to polymerize the same. Although this polycarbonate has excellent properties in heat resistance and impact strength (or impact resistance) it is poor in weatherproof property. Thus, it shows the defect that cleavage of its carbonate ester bonds occurs upon exposure to ultraviolet rays and its molecular weight is lowered.

In order to improve this defect, according to the prior art, a small amount of ultraviolet absorbing compound was added to the polycarbonate powder and subsequently the mixture was subjected to extrusion molding to make pellets. This prior art method, however, has the following disadvantages:

(1) It is very difficult to keep a fixed content of said ultraviolet absorbing compound because it vents itself up during extrusion molding and is reduced in its quantity;

(2) Only a small amount of the compound can be added because of its characteristic yellow color; and (3) Since the ultraviolet abosrbing compound is added in the form of a monomer, the physical properties of the resultant polycarbonate composition are inferior.

SUMMARY OF THE INVENTION

To overcome such defects and to obtain a polycarbonate composition with excellent weatherproof properties, the present invention was made. As a result, it has been found that by adding ultraviolet absorbing compound having a hydroxy group to effect condensation of the polymerization reaction system of oligomeric carbonate, said compound binds chemically to the terminal of the polycarbonate and exhibits ultraviolet absorbing action as well as molecular weight adjusting action, and thus, weatherproof polycarbonate with an excellent quality is obtained. Accordingly, the present invention provides an improved method of producing polycarbonate with an excellent weatherproof property by adding ultraviolet absorbing compound having a hydroxy group as at least a part of the molecular weight modifier to the oligomeric polycarbonate which is obtained by the reaction of a dioxy compound and phosgene, and then condensing said oligomeric polycarbonate to polymerize the same to yield the desired polymer composition.

DESCRIPTION OF THE INVENTION

In effecting the present invention, first an oligomeric polycarbonate is prepared by the reaction of a dioxy compound with phosgene. The term dioxy compound includes all the compounds which are commonly used for preparing these polycarbonates, for example, 4,4'-dioxydiphenyl-alkane, such as 4,4'-dioxyphenyl-2,2-propane (i.e. bisphenol A), 4,4'-dioxydiphenyl-1,1-butane, 4,4'-dioxydiphenyl-1,1-cyclohexane and their halogenated or sulfonated derivatives. The reaction of dioxy compound with phosgene is carried out by common method, namely, agitating a mixture of aqueous alkaline solution of dioxy compound and water-immiscible solvent such as methylene chloride or ethylene chloride in a vessel and blowing phosgene into the mixture. This reaction is terminated when a pH value of the solution reaches 12 to 9. However, this batch process has disadvantages: (1) It is difficult to remove the heat of reaction: (2) The quality of the oligomeric polycarbonate obtained is not uniform (thus, this process cannot produce a final product polycarbonate composition with a good reproducibility): and (3) A large amount of phosgene is consumed. Therefore, it is advantageous to carry out the process of producing the oligomeric polycarbonate in a tube-type reactor in which a dioxy compound in alkaline solution and an organic solvent for the polycarbonate are introduced continuously to form a turbulent flow (or a mixed phase stream) and subsequently phosgene is added to the reaction mixture concurrently with cooling outside of the reactor to produce the desired oligomeric polycarbonate.

In conducting the aforesaid reaction using the tube-type reactor, the turbulent flow formed in the reactor is vaporized by the heat of reaction caused by the introduction of phosgene. As phosgene comes into good contact with this flow, only a theroretical amount of phosgene is sufficient to complete the reaction. Moreover, the reaction proceeds in a short period of time.

The heat of reaction vaporizes a part of the organic solvent, and thus, the solvent containing oligomer as reaction product and the aqueous solution containing the resulting alkali chloride are brought into an atomized state. By cooling the outside of the reactor, these vapors are gradually condensed during their flowing to the outlet of the reactor. Thus, the reaction product is finally taken out as a turbulent flow of an organic solvent phase containing oligomer and an aqueous phase containing alkali chloride and residual alkali. The reaction product obtained is separated into two phases by standing for some time. Feeding of phosgene to the turbulent flow of the alkaline solution of dioxy compound and the organic solvent is done from one inlet of the reactor. In the case where a larger reactor is used, it is preferable to feed phosgene from two or more inlets so that local run-away reactions are minimized and excessive consumption of phosgene is prevented.

As to the tube-type reactor, it is designed having a sufficiently large ratio of tube length to tube diameter (tube length/tube diameter $>$ 8) in order to attain complete condensation of vaporized solvent and complete solubilization of resultant oligomer to the solvent. Moreover, the reactor which has an outside cooling system such as a cooling jacket or cooling bath is used preferably in the present invention.

The average molecular weight of oligomer is controlled by suitably selecting the reaction conditions. For instance, oligomer having an average molecular weight of about 450 to about 500 is obtained with a good reproducibility by keeping the final reaction mixture weakly alkaline, when e.g., bisphenol A and phosgene are reacted in the presence of methylene chloride as the solvent using a tube-type reactor.

In effecting the process, according to the present invention, oligomer having the hydroxy (—OH) group and the chloroformate (—OCOCl) group at the termini of the molecule are obtained as described above. The proportions of these groups varies depending upon the method of introducing phosgene, the concentration of alkaline solution of dioxy-compound and the reaction temperature, but in most cases, the chloroformate group is in excess.

Specific features of the present invention include producing polycarbonate with an excellent weatherproof property by condensing oligomeric polycarbonate thus obtained in the presence of ultraviolet absorbing compound having a hydroxy group, eliminating hydrogen chloride. The hydroxy group of the ultraviolet absorbing compound reacts with the terminal chloroformate group of the polycarbonate and binds chemically to the termini of the polycarbonate. By this reaction, the molecular weight of the polycarbonate produced is controlled and also, its weatherproof property is improved.

Preferable examples of ultraviolet absorbing compounds which are used in the present invention are as follows: benzotriazole compounds such as 2(2'-hydroxy-5'-methylphenyl) benzotriazole, 2(2'-Hydroxy-4'-methylphenyl benzotriazole, 2(2'-hydroxy-3',5'-di-t-butylphenyl) benzotriazole, 2(2'-hydroxy-3'-t-butyl-5'-methylphenyl)-5-chlorobenzotriazole, 2(2'-hydroxy-3',5'-di-t-butylphenyl)-5-chlorobenzotriazole, 2(2'-hydroxy-4'-octoxyphenyl)benzotriazole; benzophenone compounds, such as, resolcinol monobenzoate, 2-hydroxy-4-methoxybenzophenone, 2-hydroxy-4-octoxybenzophenone, 2-hydroxy-4-octadecyloxybenzophenone, 2-hydroxy-4-benzyloxybenzophenone, 2-hydroxy-4-methoxy-2'-carboxybenzophenone, 4-dodecyl-2-hydroxybenzophenone, 5-chloro-2-hydroxybenzophenone, 2-hydroxy-4-methoxy-4'-chloro-benzophenone, 2-hydroxy-4-methoxy-5-sulfobenzophenone; phenyl salicylate compounds, such as, phenyl salicylate, 4-t-butyl phenyl salicylate, p-octylphenyl salicylate, p-t-butyl phenyl salicylate. All of the compounds shown above are used either singly or as mixtures. In any event, compounds having a hydroxy group are employed effectively in the present invention. These compounds are successfully used as molecular weight modifiers in the present invention either singly or as mixtures with alcohols or phenols of common use.

In effecting the process of condensation polymerization of oligomeric polycarbonate according to this invention, an ultraviolet absorbing compound described above and, if desired, other molecular weight modifiers, catalysts, antioxidants and alkali metal hydroxides are added to the oligomeric polycarbonate in an organic solvent and then the mixture is agitated while cooling. Furthermore, it is advantageous to add a monomer component, a dioxy-compound, to the condensation polymerization reaction system in the form of an aqueous alkaline solution and then react it with the oligomeric polycarbonate. By this additional reaction of the monomer, there is more easily obtained a polycarbonate with higher molecular weight and also a copolymer-type polycarbonate with the desired property is produced by selecting the kinds of monomer. For example, polycarbonate with a sufficient fireproof property is obtained using tetrabromobisphenol A as the monomer component.

The organic solvents used for this invention are solvents which are capable of dissolving oligomeric polycarbonates and high molecular polycarbonates, for instance, chlorinated hydrocarbons, such as methylene chloride, tetrachloroethane, 1,2-dichloroethylene, chloroform, trichloroethane, dichloroethane and chlorobenzene; dioxane; tetrahydrofuran; acetophenone, and so forth. Methylene chloride is a particularly preferred solvent.

As catalysts, tertiary amines or quaternary ammonium slats are preferably used. Examples of these catalysts are trimethylamine, triethylamine, triproplyamine, tributylamine, trimethyl benzylammonium chloride, and the like.

As a molecular weight modifier, methanol, ethanol, isopropanol, butanol, phenol, cresol, butylphenol, etc., which are commonly used, is used. As an antioxidant, sodium hydrosulfite, and the like, is employed.

According to the process of the present invention, weatherproof polycarbonate with a good quality is produced advantageously, differing from conventional methods where are ultraviolet absorbing compound is added. Thus, in the present invention, an ultraviolet absorbing compound is used at least as a part of the molecular weight modifier and the compound is chemically bound to the polycarbonate molecule. Therefore, the content of ultraviolet absorbing compound in the polycarbonate is easily kept constant and also, the ultraviolet absorbing compound is dispersed evenly among the polycarbonate molecules. Since the polycarbonate produced by the method of the present invention contains ultraviolet absorbing compound bound chemically to the polymer, the mechanical property of the polycarbonate is not harmed. On the other hand, polycarbonate produced by the conventional method contains the compound in the state of physical mixture and thus the mechanical property of the product deteriorates. Furthermore, according to the method of the present invention, the ultraviolet absorbing compound does not vent itself or bleed out during the extrusion molding. In addition, upon using the compound for various purposes, the ultraviolet absorbing compound does not leak out from the polymer and thus it does not cause the problem of environmental pollution. As indicated above, the present invention has various advantages which could not be attained by conventional methods and has great industrial significance.

Polycarbonate compositions produced by the present invention have excellent weatherproof properties and mechanical strength as described in the foregoing. The polycarbonates are favorably used for various purposes, for example, as covers of street lamps; as lenses of traffic signals; as covers of light of vehicles; as traffic doors and soundproof walls for highways.

The invention is described in greater detail by the following specific examples, which are merely intended to be illustrative and not restrictive in any way.

EXAMPLE 1

An aqueous solution of 1.7 N NaOH (500 ml) was placed in a one-liter separable flask with a stirrer, a thermometer and a reflux condenser, and bisphenol A (91 g) was added to the solution and was dissolved. Subsequently, methylene chloride (200 ml) was added to this solution and phosgene was introduced (40 g/hour) while stirring. The reaction temperature was kept at 20° C. by cooling outside of the flask. After 95 minutes of reaction, the pH of the mixture became 11.5. At this point, phosgene introduction and stirring were stopped, and then the reaction mixture was separated into two phases by standing. The upper phase which is an aqueous solution of NaCl was removed by decantation and subsequently methylene chloride containing bisphenol A-polycarbonate oligomer was obtained.

Then the above oligomer solution was diluted with 250 ml of methylene chloride, and subsequently, the diluted solution was stirred for 90 minutes while keeping it at 30° C., after the addition of 0.8 g of 2(2'-hydroxy-5'-methylphenyl) benzotriazole as ultraviolet absorbing molecular weight modifier, 160 ml of 2.0 N NaOH containing bisphenol A (36 g) and trimethylbenzyl ammonium chloride (0.056 g) as a catalyst and 18 ml of aqueous 48% NaOH. By this process, chloroformates were completely reacted and a viscous emulsion was obtained. The emulsion was diluted with methylene chloride to make polymer concentration of 7% and then it was washed with water to remove inorganic salts. Consequently, clear methylene chloride solution of polycarbonate can be obtained. Polycarbonate powder obtained by precipitating in methanol was dried. In the powder, free benzotriazole was not detected. By measuring concentration of terminal groups of polymer, more than 90% of the above-mentioned benzotriazole were found to be bound to termini of the polymer. Methylene chloride solution of the powder of polymer was casted to make a film (thickness of 0.2 mm) which had a viscometric average molecular weight of 33,800. The viscometric average molecular weight of the film after irradiation for 340 hours in a weather-o-meter (carbon arc type) was 33,700. Accordingly, deterioration and coloration by irradiation of ultraviolet ray were not observed and ultraviolet-proof effect was shown.

COMPARATIVE EXAMPLE 1

Condensation of bisphenol A-polycarbonate oligomer and bisphenol A was conducted in the same manner as described in Example 1, except that p-t-butyphenol (0.6 g) was used as a molecular weight modifier. Processing of the reaction mixture and preparation of the film were conducted in the same manner as described in Example 1. Molecular weight of the film was 35,400. After irradiating for 340 hours in a weather-o-meter, a viscometric average molecular weight decreased to 31,000 and deterioration and coloration of the polymer were remarkable compared with the film of Example 1.

EXAMPLE 2

Condensation of bisphenol A-polycarbonate oligomer and bishpenol A was carried out in the same manner as described in Example 1, except that 2(2'-hydroxy-5'-methylphenyl) benzotriazole (0.3 g) and p-t-butylphenol (1.0 g) were used as a molecular weight modifier. Molecular weight of the polymer obtained was 24,400. Processing of reaction mixture and preparation of the film were conducted in the same manner as described in Example 1. After irradiation of the film for 340 hours in a weather-o-meter, the viscometric average molecular weight was 24,000 without showing any depolymerization.

EXAMPLE 3

Condensation of bisphenol A-polycarbonate oligomer and bisphenol A was conducted in the same manner as described in Example 1, except that 2(2'-hydroxy-5'-methylphenyl) benzotriazole (0.8 g) as a molecular weight modifier and triethylamine (0.03 g) as a catalyst were used. More than 90% of benzotriazole used was found to be bound to termini of polymer. The film prepared as described in Example 1 had a viscometric average molecular weight of 33,500. After irradiation for 340 hours in a weather-o-meter, the molecular weight of the polymer was found to be 33,600 showing no deterioration or coloration.

EXAMPLE 4

Condensation of bisphenol A-polycarbonate oligomer and bisphenol A was conducted in the same manner as described in Example 1, except that 2(2'-hydroxy-4'-octoxyphenyl) benzotriazole (2.0 g) was used as a molecular weight modifier. The film prepared as described in Example 1 was found to have a viscometric average molecular weight of 24,100. After irradiation for 340 hours in a weather-o-meter, the molecular weight was found to be 24,000 showing ultravioletproof effect.

EXAMPLE 5

Condensation of bisphenol A-polycarbonate oligomer and bisphenol A was conducted in the same manner as described in Example 1, except that 2(2'-hydroxy-3', 5'-di-t-butylphenyl) benzotriazole (1.2 g) was used as a molecular weight modifier. More than 90% of benzotriazole used were found to be bound to termini of the polycarbonate. The film prepared in the same way as described in Example 1 had a viscometric average molecular weight of 37,000 and, after irradiation for 340 hours in a weather-o-meter the molecular weight was 36,900 showing ultraviolet-proof effect.

EXAMPLE 6

Condensation of bisphenol A-polycarbonate oligomer and bisphenol A was conducted in the same manner as described in Example 1, except that 2(2'-hydroxy-3'-t-butyl-5'-methylphenyl)5-chlorobenzotriazole (1.1 g) as ultraviolet absorbing molecular weight modifier and triethylamine (0.04 g) as a catalyst were used. As a result, more than 90% of triazole used were reacted with termini of the polymer. Processing of the reaction mixture and preparation of the film were conducted as described in Example 1. Molecular weight of the film was 31,300 and after irradiation for 340 hours in a weather-o-meter, the molecular weight was found to be 31,200 showing ultravioletproof effect.

EXAMPLE 7

Condensation of bisphenol A-polycarbonate oligomer and bisphenol A was conducted in the same manner as described in Example, 1, except that 2-hydroxy-4-methoxybenzophenone (2.9 g) as an ultraviolet absorbing molecular weight modifier and trimethylamine (0.4 g) as a catalyst were used. As the result, more than 90% of triazole used were reacted with termini of the polymer. Molecular weight of the film prepared in the same manner as described in Example 1 was 26,400 and after irradiation for 340 hours in a weather-o-meter the molecular weight of the film was found to be 38,200 showing significant increase of molecular weight and ultravioletproof effect.

EXAMPLE 8

An aqueous solution of 1.65 N NaOH (15 liters) was placed in a 30 liter glass-lined stirring vessel with a cooling jacket and a thermometer, and 2,630 g of bisphenol A was dissolved in the solution. To this solution, 7 liters of methylene chloride were added and then phosgene was introduced with the flow rate of 1.1 kg per hour while stirring. During the proceeding reaction, the vessel was cooled by flowing water through the jacket in order that reaction temperature would not exceed 30° C. After 90 minutes pH of the reaction mixture became 11.0 and at this stage, introduction of phosgene and stirring were terminated and subsequently, the reaction mixture was separated into two phases by standing. Polycarbonate oligomer in methylene chloride was obtained by removing aqueous upper phase. Then the oligomer solution was diluted with 9 liters of methylene chloride, and subsequently stirring was re-initiated after adding 22 g of 2(2'-hydroxy-5'-methylphenyl) benzotriazole, 4.5 liters of 1.7 N NaOH containing bisphenol A (785 g) and trimethylbenzyl ammonium chloride (1.5 g) and 400 ml of aqueous 48% NaOH in this order. The reaction temperature was kept at 30° C. by flowing cooling water through the jacket. After 90 minutes, the reaction mixture became a viscous emulsion. The emulsion was diluted with methylene chloride to make polymer concentration of 6% and then it was thoroughly washed with water to remove inorganic salts. Powder polycarbonate (3.5 kg) was obtained by precipitating the polymer in methanol and collecting it with centrifugation and subsequently by drying. The reaction rate of above mentioned benzotriazole was 95%. The polycarbonate thus obtained was made into pellets using an extruder of barrel diameter of 30 mm equipped with a vent (8 mmHg). No scattering of benzotriazole to the vent was observed during extrusion molding. The pellets were molded into a film of 0.2 mm by compression molding. The molecular weight of the film was 33,000. After irradiation for 340 hours in a weather-o-meter, lowering of molecular weight due to deterioration was not observed at all.

COMPARABLE EXAMPLE 2

Condensation was conducted in the same manner as described in Example 8, except that p-t-butylphenol (15 g) was used in place of 2(2'-hydroxy-5'-methylphenyl) benzotriazole. Processing of the reaction mixture was also carried out in the same manner as described in Example 8 and powder polycarbonate was obtained. The film prepared as Example 8 had the molecular weight of 32,100. After irradiation for 340 hours in a weather-o-meter, the molecular weight decreased to 29,000 showing yellowish brown coloration.

A mixture containing 100 parts of powder polycarbonate of 0.98 parts of 2(2'-hydroxy-5'-methyl-phenyl) benzotriazole was blended thoroughly and then was made into pellets using an extruder having barrel diameter of 30 mm equipped with a vent (8 mmHg). Scattering of benzotriazole to the vent was observed considerably and pellets thus obtained contained only 0.76 parts of the above-mentioned benzotriazole.

EXAMPLE 9

An aqueous alkaline solution was prepared by dissolving 60 kg of bisphenol A in 400 liters of aqueous 5.5% NaOH. This aqueous alkaline solution of bisphenol A and methylene chloride were introduced at room temperature into a double tube-type reactor having the inside diameter of 10 mm and the length of 10 m at the flow rate of 138 liters per hour and 69 liters per hour, respectively, and furthermore, phosgene was fed concurrently at the flow rate of 10.7 kg per hour to proceed the reaction continuously for 2 hours. The reactor used above had a double pipe structure and through an annular space, cooling water was passed to keep the temperature of the reaction solution to 25° C. at outlet of the reactor. The pH of the reaction mixture was kept at 10 to 11.

The reaction mixture thus obtained was separated by standing to an aqueous layer and methylene chloride layer containing bisphenol A-polycarbonate oligomer.

Then the methylene chloride solution (10 liters), after removal of the aqueous solution, was placed in a glas-slined stirring vessel with a water jacket and was diluted with 7 liters of fresh methylene chloride. Subsequently, 22 g of 2(2'-hydroxy-5'-methylphenyl) benzotriazole, 5 liters of distilled water dissolving 1.8 g of trimethylbenzyl ammonium chloride, 620 ml of aqueous 45% NaOH and 785 g of bisphenol A were added to the reactor and the whole mixture was stirred for 90 minutes below 30° C. Resulted viscous emulsion was diluted with methylene chloride to get polymer concentration of 6% and then it was washed with water thoroughly to remove inorganic salts. Precipitates of polymer obtained in methanol were filtered and dried. Powder polycarbonate thus obtained was made into pellets using an extruder of 30 mm in barrel diameter equipped with vent (7 mmHg) and then they were molded to a film with thickness of 0.2 mm by compression molding. The molecular weight of the film was 30,500 and after irradiation for 340 hours in a weather-o-meter, it was found to be 30,700 showing no deterioration.

EXAMPLE 10

Condensation was conducted in the same manner as described in Example 9, except that the oligomerization reaction was carried out continuously for 10 hours. The molecular weight of the polymer was 30,600. After irradiation of 0.2 mm film for 340 hours in a weather-o-meter, the molecular weight was also 30,600. It may be understood by this example that polycarbonate with excellent weather-proof property can be made with a good reproducibility by the method of the present invention.

EXAMPLE 11

An aqueous solution of 6.0% NaOH (15 liters) was placed in a 30 liter glass-lined stirring vessel with a cooling jacket and a thermometer, and then 2,630 g of bisphenol A was dissolved in the solution. To this solution, 7 liters of methylene chloride were added and then phosgene was introduced with the flow rate of 1.1 kg per hour while stirring. During proceeding reaction, the vessel was cooled by flowing water through the jacket in order that reaction temperature would not exceed 30° C. After 90 minutes, pH of the mixture became 11.0 and, at this stage, introduction of phosgene and stirring were terminated and subsequently, the reaction mixture was separated into two phases by standing. The upper phase containing an aqueous solution was removed.

Thereafter, 9 liters of methylene chloride were added to the lower phase and stirring was initiated again, after adding 16 g of 2(2'-hydroxy-4'-octoxyphenyl)benzotriazole, 28 g of p-t-butylphenol, 4.5 liters of 1.7 N NaOH dissolving 785 g of bisphenol A and 400 ml of aqueous 48% NaOH and 4 g of treiethylamine in this order. The reaction temperature was kept below 30° C. by flowing cooling water through the jacket. The viscous emulsion obtained after 70 minutes was diluted with methylene chloride to get polymer concentration of 6% and then it was thoroughly washed with water to remove inorganic salts. Precipitation of polymer in methanol and separation by centrifugation followed by drying gave 3.7 kg of powder polycarbonate. The molecular weight of the polymer was 24,500. In the polycarbonate thus obtained, more than 95% of 2(2'-hydroxy-4'-octoxyphenyl) benzotriazole was present as end group of polymer. The molecular weight of 0.2 mm film was 24,300 and after irradiation for 340 hours in a weather-o-meter, it was 24,400 showing no depolymerization. In order to examine the reproducibility of the reaction, the same procedures as described above were carried out and 0.2 mm film of polycarbonate obtained was found to have the molecular weight of 26,800. After irradiation for 340 hours in a weather-o-meter, the molecular weight was found to be 26,600.

Comparing the results of Example 9 and Example 10, it is understood clearly that the production of oligomers using a tube-type reactor is more reproducible than that using a batch-type reaction vessel.

While specific examples of the invention have been described in detail to illustrate the application of the principles of the invention, it will be understood that the invention may be embodied otherwise without departing from such principles.

What is claimed is:

1. Process for preparing polycarbonate compositions with excellent weatherproofing properties which comprises adding an ultraviolet absorbing compound having a hydroxy group as at least part of the molecular modifier to an oligomeric polycarbonate which is obtained by the reaction of a dihydroxy compound with phosgene, subsequently condensing said oligomeric polycarbonate to polymerize the same to form a polycarbonate composition, and recovering the so obtained polycarbonate composition with the desired excellent weatherproofing properties, said ultraviolet absorbing compound being a benzotriazole compound.

2. Process for preparing polycarbonate compositions with excellent weatherproofing properties which comprises adding an ultraviolet absorbing compound having a hydroxy group as at least part of the molecular modifier to an oligomeric polycarbonate which is obtained by the reaction of a dihydroxy compound with phosgene, subsequently condensing said oligomeric polycarbonate to polymerize the same to form a polycarbonate composition, and recovering the so-obtained polycarbonate composition with the desired excellent weatherproofing properties, said ultraviolet absorbing compound being a phenyl salicylate compound.

3. Process for preparing polycarbonate compositions with excellent weatherproofing properties which comprises adding an ultaviolet absorbing compound having a hydroxy group as at least part of the molecular modifier to an oligomeric polycarbonate which is obtained by the reaction of a dihydroxy compound with phosgene, subsequently condensing said oligomeric polycarbonate to polymerize the same to form a polycarbonate composition, and recovering the so-obtained polycarbonate composition with the desired excellent weatherproofing properties, said ultraviolet absorbing compound being a member selected from the group consisting of resorcinol monobenzoate, 2-hydroxy-4-methoxybenzophenone, 2-hydroxy-4-octoxybenzophenone, 2-hydroxy-4-octadecyloxybenzophenone, 2-hydroxy-4-benzyloxybenzophenone, 2-hydroxy-4-methoxy-2'-carboxybenzophenone, 4-dodecyl-2-hydroxybenzophenone, 5-chloro-2-hydroxybenzopheone, 2-hydroxy-4-methoxy-4'-chlorobenzophenone, and 2-hydroxy=4-methoxy-5-sulfobenzophenone.

4. Method according to claim 1, wherein said benzotriazole compound is selected from the group consisting of 2(2'-hydroxy-5'methylphenyl) benzotriazole, 2(2'-hydroxy-3',5'di-t-butyl-phenyl)benzotriazole, 2(2'-hydroxy-3'-t-butyl-5' methylphenyl)-5-chlorobenzotrizole, 2(2'-hydroxy-3',5'-di-t-butylphenyl)-5-chlorobenzotriazole, and 2(2'-hydroxy-4'-octoxyphenyl) benzotriazole.

5. Method according to claim 2, wherein said salicylate compound is selected from the group consisting of phenylsalicylate, 4-t-butyl phenyl salicylate, p-octylphenyl salicylate, and p-t-butyl phenyl salicylate.

6. Process for preparing polycarbonate compositions with excellent weatherproofing properties which comprises adding an ultraviolet absorbing compound having a hydroxy group as at least a part of the molecular weight modifier to an oligomeric polycarbonate which is obtained by the reaction of a dihydroxy compound with phosgene, subsequently condensing said oligomeric polycarbonate to polymerize the same to form a polycarbonate composition, and recovering the so-obtained polycarbonate composition with the desired excellent weatherproofing properties, said ultraviolet absorbing compound being selected from the group consisting of 2(2'-hydroxy-5'methylphenyl) benzotriazole, 2(2'-hydroxy-4'-octoxyphenyl) benzotriazole, 2(2'-hydroxy-3',5'-di-t-butylphenyl) benzotriazole, 2(2'-hydroxy-3't-butyl-5'-methylphenyl)-5-chloro-benzotriazole, 2(2'-hydroxy-3',5'-di-t-butylphenyl-5-chlorobenzotriazole, 2-hydroxy-4-methoxybenzophenone, 2-hydroxy-4-octoxybenzophenone, 2-hydroxy-4-octadecyloxybenzophenone, 2-hydroxy-4-benzyloxybenzophenone, 2-hydroxy-4-methoxy-2'-carboxybenzophenone, 4-dodecyl-2-hydroxy-benzophenone, 5-chloro-2-hydroxy-benzophenone, 2-hydroxy-4-methoxy-4'chlorobenzophenone, 2-hydroxy-4-methoxy-5-sulfobenzophenone, phenylsalicylate, 4-t-butylphenyl salicylate, p-octylphenyl salicylate and p-t-butylphenyl salicylate.

7. The process according to claim 6, wherein the ultraviolet absorbing compound is selected from the group consisting of 2(2'hydroxy-5'methylphenyl)benzotriazole and 2(2'-hydroxy-4'octoxyphenyl) benzotriazole.

* * * * *